(12) United States Patent
Xiong et al.

(10) Patent No.: US 11,463,776 B2
(45) Date of Patent: Oct. 4, 2022

(54) VIDEO PLAYBACK PROCESSING METHOD, TERMINAL DEVICE, SERVER, AND STORAGE MEDIUM

(71) Applicant: BEIJING BYTEDANCE NETWORK TECHNOLOGY CO., LTD., Beijing (CN)

(72) Inventors: Hao Xiong, Beijing (CN); Mengluo Feng, Beijing (CN); Peiqi Wu, Beijing (CN); Dawei Chen, Beijing (CN); Lin Wang, Beijing (CN); Jingui Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/980,758

(22) PCT Filed: Apr. 8, 2019

(86) PCT No.: PCT/CN2019/081681
§ 371 (c)(1),
(2) Date: Sep. 14, 2020

(87) PCT Pub. No.: WO2020/007082
PCT Pub. Date: Jan. 9, 2020

(65) Prior Publication Data
US 2021/0377618 A1    Dec. 2, 2021

(30) Foreign Application Priority Data
Jul. 4, 2018   (CN) .......................... 201810726041.7

(51) Int. Cl.
*H04N 21/472*   (2011.01)
*H04N 21/234*   (2011.01)
(Continued)

(52) U.S. Cl.
CPC . *H04N 21/47217* (2013.01); *H04N 21/23418* (2013.01); *H04N 21/47202* (2013.01); *H04N 21/4882* (2013.01); *H04N 21/8456* (2013.01)

(58) Field of Classification Search
CPC ....... H04N 21/47217; H04N 21/23418; H04N 21/47202; H04N 21/4882; H04N 21/8456
See application file for complete search history.

(56) References Cited

U.S. PATENT DOCUMENTS

2018/0152767 A1*   5/2018   Liu .................... H04N 21/4325

FOREIGN PATENT DOCUMENTS

| CN | 102222103 A | 10/2011 |
| CN | 103873955 A | 6/2014 |

(Continued)

OTHER PUBLICATIONS

International Search Report and Written Opinion dated Jun. 27, 2019 for PCT Patent Application No. PCT/CN2019/081681.
(Continued)

*Primary Examiner* — Thai Q Tran
*Assistant Examiner* — Jose M Mesa
(74) *Attorney, Agent, or Firm* — Thomas | Horstemeyer, LLP

(57) ABSTRACT

Disclosed is a video playing processing method. The method includes: receiving prompt information for playing a second video associated with a first video sent by an application server, the first video is a video being currently played, and the first video and the second video include a same video content segment; and showing the prompt information for playing the second video associated with the first video. Disclosed are also a terminal device, a server, and a storage medium.

20 Claims, 9 Drawing Sheets

A terminal device receives prompt information for playing a second video associated with a first video sent by an application server, where the first video is a video being currently played by the terminal device, and the first video and the second video include a same video content segment — S110

The terminal device shows the prompt information for playing the second video associated with the first video — S120

(51) Int. Cl.
*H04N 21/488* (2011.01)
*H04N 21/845* (2011.01)

(56) References Cited

FOREIGN PATENT DOCUMENTS

| | | |
|---|---|---|
| CN | 105163156 A | 12/2015 |
| CN | 105898498 A | 8/2016 |
| CN | 107609149 A | 1/2018 |
| CN | 107786905 A | 3/2018 |
| CN | 108024145 A | 5/2018 |
| WO | 2016123495 A1 | 8/2016 |
| WO | 2016148807 A1 | 9/2016 |
| WO | 2018111372 A1 | 6/2018 |

OTHER PUBLICATIONS

1st Search Report dated Jul. 9, 2020 for Chinese Patent Application No. 201810726041.7.
1st Office Action dated Jul. 22, 2020 for Chinese Patent Application No. 201810726041.7.

* cited by examiner

VIDEO PLAYBACK PROCESSING METHOD, TERMINAL DEVICE, SERVER, AND STORAGE MEDIUM

CROSS-REFERENCE TO RELATED APPLICATIONS

The present application is a National Stage Application, filed under 35 U.S.C. 371, of International Patent Application No. PCT/CN2019/081681, filed on Apr. 8, 2019, which claims priority to a Chinese patent application No. 201810726041.7 filed on Jul. 4, 2018, contents of both of which are incorporated herein by reference in their entireties.

TECHNICAL FIELD

Embodiments of the present disclosure relate to the technical field of video processing, for example, to a video playing processing method, a terminal device, a server, and a storage medium.

BACKGROUND

With the development of the Internet and smart terminals, a variety of video services enrich users' lives, work and entertainment. In particular, short videos are gradually favored by multiple platforms and users for the characteristics of being suitable for viewing in a mobile state and short-term leisure state, high-frequency push, and high participation.

When a user is watching a short video in a movie or TV series, the user may want to know which movie or TV series this short video is selected from, and further watch the full version of the movie or TV series. According to the method in the related art, the user can only interrupt the current short video by himself, and obtain a full version of the movie or TV series on the premise of knowing the movie or TV series to which the short video belongs; without knowing the movie and TV series to which the short video belongs, the search cannot be performed, which affects user experience.

SUMMARY

Embodiments of the present disclosure provides a video playing processing method, a terminal device, a server, and a storage medium, which can provide a user with prompt information for playing a second video having a same video content as a first video during the user watching the first video, optimize a video playing mode and improve user experience.

In an embodiment, the present disclosure provides a video playing processing method, which is applied to a terminal device and includes following steps.

Prompt information for playing a second video associated with a first video sent by an application server is received, where the first video is a video being currently played, and the first video and the second video include a same video content segment.

The prompt information for playing the second video associated with the first video is showed.

In an embodiment, the present disclosure provides a video playing processing method, which is applied to an application server and includes following steps.

A video query request message is sent, where the video query request message includes identification information of a first video.

A returned video query response message is received, where the video query response message includes identification information of a second video, and the first video and the second video include a same video content segment.

The prompt information for playing the second video associated with the first video to a terminal device is sent, where the first video is a video being currently played by the terminal device.

In an embodiment, the present disclosure provides a terminal device, including: a receiving module and a display module.

The receiving module is configured to receive prompt information for playing a second video associated with a first video sent by an application server, the first video is a video being currently played, and the first video and the second video include a same video content segment.

The display module is configured to show the prompt information for playing the second video associated with the first video.

In an embodiment, the present disclosure provides an apparatus for querying information associated with video, which includes a sending module, and a receiving module.

The sending module is configured to send a video query request message, and the video query request message includes identification information of a first video.

The receiving module is configured to receive a returned video query response message, the video query response message includes identification information of a second video, and the first video and the second video include a same video content segment.

The sending module is further configured to send the prompt information for playing the second video associated with the first video to a terminal device, and the first video is a video being currently played by terminal device.

In an embodiment, the present disclosure provides a terminal device, including: one or more processors; and a memory, which is configured to store one or more programs; where when executed by the one or more processors, the one or more programs causes the one or more processors to implement methods described in the above embodiments applied to the terminal device side.

In an embodiment, the present disclosure provides an application server, including: one or more processors; and a memory, which is configured to store one or more programs; where when executed by the one or more processors, the one or more programs causes the one or more processors to implement methods described in the above embodiments applied to the application server side.

In an embodiment, the present disclosure further provides a computer-readable storage medium on which a computer program is stored, where the computer program is executed by a processor to implement the method described in any of the above embodiments;

DETAILED DESCRIPTION

Figure 1:
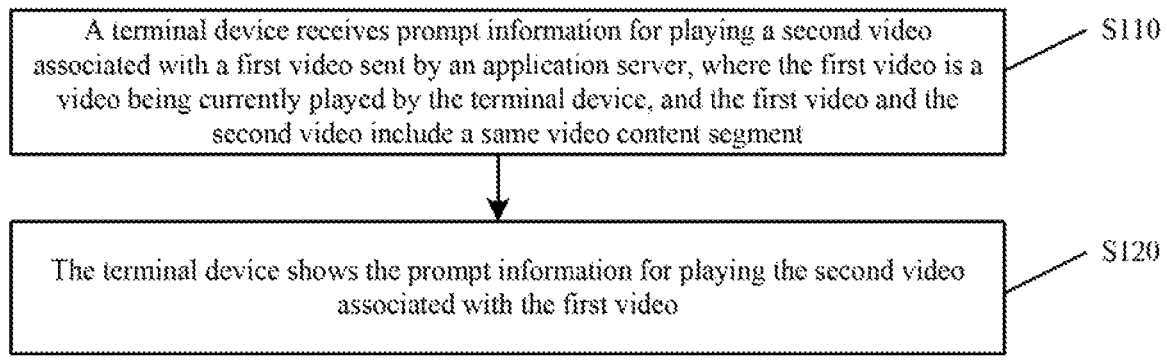
FIG. 1 is a schematic flowchart of a video playing processing method according to an embodiment of the present disclosure.

Hereinafter the present disclosure will be described in detail in conjunction with the drawings and specific embodiments. The embodiments described herein are only used to illustrate and not to limit the present disclosure. For convenience of description, only part, not all, of the structures related to the present disclosure are illustrated in the drawings.

Embodiments of the present disclosure provide a video playing processing method, a terminal device, a server, and a storage medium, which can provide a user with prompt for playing a second video having a same video content as a first video during the user watching the first video, optimize a video playing mode, omit user operation steps and improve user experience.

In the present disclosure, the terms "system" and "network" herein are often used interchangeably. The wording "and/or" in the embodiments of the present disclosure refers to inclusion of any of one or more related listed items and all combinations thereof. The terms "first", "second" and the like in the description, claims and drawings of the present disclosure are used to distinguish between different objects and are not used to limit a particular order.

The following embodiments of the present disclosure may be executed separately, and different embodiments may also be executed in combination with each other, which is not specifically limited in the embodiments of the present disclosure.

The embodiments of the present disclosure may be applied to an application scenario of video playing. The scenario may include: a terminal device (such as a smart TV, a mobile phone application) capable of playing videos or controlling other devices to play videos, and a server. The server may include an application server that provides support for the terminal device, a storage server that stores video resources, and an association relationship server that stores video association relationship. In addition, the association relationship may also be stored in a database module of the application server. The storage server and the association relationship server provide service interfaces for the application server respectively, so that the application server may respond to one or more instructions input by the user through the terminal device. In practical applications, the storage server and the association relationship server may be integrated in one server device, or may be set in different server devices, and the association relationship server and the application server may also be integrated in one server device, or may be set in different server devices, which is not specifically limited in the embodiments of the present disclosure.

Embodiment 1

FIG. 1 is a schematic flowchart of a video playing processing method according to an embodiment of the present disclosure. The method disclosed in the embodiment of the present disclosure is applicable to a terminal device. For example, the method may be implemented by installing an application program on the terminal device, as shown in FIG. 1, including steps S110 to S120.

In step S110, the terminal device receives prompt information for playing a second video associated with a first video sent by an application server, the first video is a video being currently played by the terminal device, and the first video and the second video include a same video content segment.

It can be understood that, the terminal device in the step may be a smart phone, or any terminal device with a video playing function such as a laptop or tablet computer, or a terminal device capable of controlling other video playing devices to play videos; the first video and the second video including the same video content segment means that the video of a certain length is included in both the first video and the second video. For example, the first video and the second video are fragments of a same TV series, the first video includes a piece of video content of an episode, and the second video includes entire video content of the episode; or the first video and the second video are both fragments of a same TV series, the first video includes a piece of video content of the Mth episode and a piece of video content of the Nth episode, while the second video includes entire video content of the Mth episode; the embodiment is not limited as long as the first video and the second video include the same video content segment.

In the embodiment, the method in which the terminal device receives the prompt information for playing the second video associated with the first video sent by the application server may also include at least one of the following two scenarios.

In scenario one, when the terminal device starts to receive video content of the first video sent by the application server, the terminal device receives the prompt information for playing the second video associated with the first video sent by the application server.

In scenario two, at a specific time point after the terminal device receives video content of the first video sent by the application server, the terminal device receives the prompt information for playing the second video associated with the first video sent by the application server.

In an embodiment, the step in which at a specific time point after the terminal device receives video content of the first video sent by the application server, the terminal device receives the prompt information for playing the second video associated with the first video sent by the application server includes at least one of the following steps.

When the terminal device pauses the video content of the first video, the terminal device receives the prompt information for playing the second video associated with the first video sent by the application server.

When the terminal device plays advertisements, the terminal device receives the prompt information for playing the second video associated with the first video sent by the application server.

When a preset time is remained until an end of playing the video content of the first video, the terminal device receives the prompt information for playing the second video associated with the first video sent by the application server.

In step S120, the terminal device shows prompt information for playing a second video associated with the first video, where the prompt information carries description information of the second video.

In an embodiment, the method in which the terminal device shows the prompt information for playing the second video associated with the first video may also include at least one of the following two scenarios.

In scenario three, the terminal device displays the prompt information for playing the second video associated with the first video on a playing page of the first video.

The scenario three is generally applicable to the scenario where the first video is applied exclusively to a playing page. When the terminal device plays the first video, the terminal device may select outsides of the first video playing window (including any one or more sides of the top, bottom, left, and right) without affecting the playing of the first video to display the prompt information for playing the second video associated with the first video.

Figure 2:
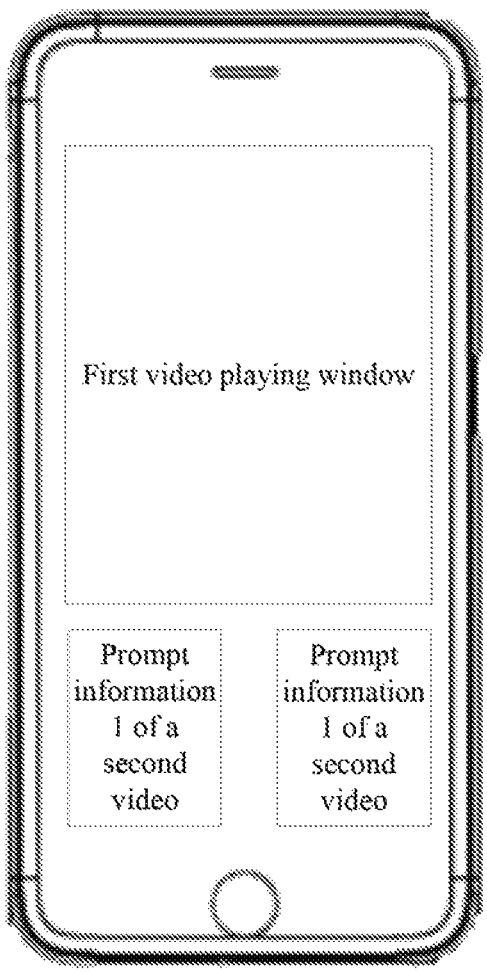
FIG. 2 is a schematic diagram of a terminal device screen according to an embodiment of the present disclosure.

Exemplarily, FIG. 2 is a schematic diagram of a terminal device screen according to an embodiment of the present disclosure, and it is assumed that there are two second videos (labeled as the second video 1 and the second video 2 in FIG. 2) having the same video content segment as the first video (that is, the first video and the second videos include the same video content segment). It can be seen from FIG. 2 that the screen of the terminal device includes a first video playing window, which is located in the middle of the screen of the terminal device, and on the lower side of the first video playing window, the prompt information for playing the second video associated with the first video is displayed, so that the user may trigger the playing request for playing the corresponding second video based on any prompt information for playing the second video associated with the first video. The scenario three is usually used corresponding to the scenario one described above.

In scenario four, the terminal device pops up a prompt bar during playing the first video, and the prompt bar includes the prompt information for playing the second video associated with the first video.

The scenario four is usually suitable for the scenario in which the first video is played in full-screen mode, or the first video playing window and multiple video playing windows are located on one playing page at the same time. In the scenario where the prompt information cannot be displayed in the playing page, when the first video is played on the terminal device, the prompt information for playing the second video associated with the first playing information may be displayed by popping up a prompt bar. The prompt bar is located above a layer of playing the first video to attract the user's attention.

Figure 3:
FIG. 3 is a schematic diagram of another terminal device screen according to an embodiment of the present disclosure.

Exemplarily, FIG. 3 is a schematic diagram of another terminal device screen according to an embodiment of the present disclosure, and it is assumed that there is one second video having the same video content segment as the first video. It can be seen from FIG. 3 that the screen of the terminal device is occupied by the first video playing window, and a prompt bar is displayed above a layer of the first video playing window. The prompt bar displays prompt information for playing the second video associated with the first video, so that the user may trigger a playing request for playing the second video based on the prompt bar.

Figure 4:
FIG. 4 is a schematic diagram of yet another terminal device screen according to an embodiment of the present disclosure.

Exemplarily, FIG. 4 is a schematic diagram of yet another terminal device screen according to an embodiment of the present disclosure. The first video playing window and multiple video playing windows are located on one playing page at the same time, and prompt information cannot be displayed in the playing page. It can be seen from FIG. 4, a prompt bar may also be displayed in the playing window of the first video being played, and the prompt bar may display prompt information for playing the second video associated with the first video, so that the user may trigger a playing request for playing the second video based on the prompt bar.

In an embodiment, if there are multiple second videos with the same video content segment as the first video, multiple prompt bars may be popped up during playing the first video; or a second video with the highest similarity to the first video is selected for prompting, which is not specifically limited in the embodiment of the present disclosure.

The scenario four and the scenario two described above are usually used correspondingly.

According to the embodiment of the present disclosure, the prompt information for playing the second video associated with the first video are received and shown during playing the first video, the user can find the second video having the same video content as the first video without searching. Compared with the method in the related art where the user pauses a currently played video and searches for a video related to the currently played video, the video playing manner is optimized and the user experience is improved.

Embodiment 2

Based on the above embodiment of the present disclosure, a first playing request for requesting to play a second video may also be triggered based on the prompt information and playing information of the second video is received.

Figure 5:
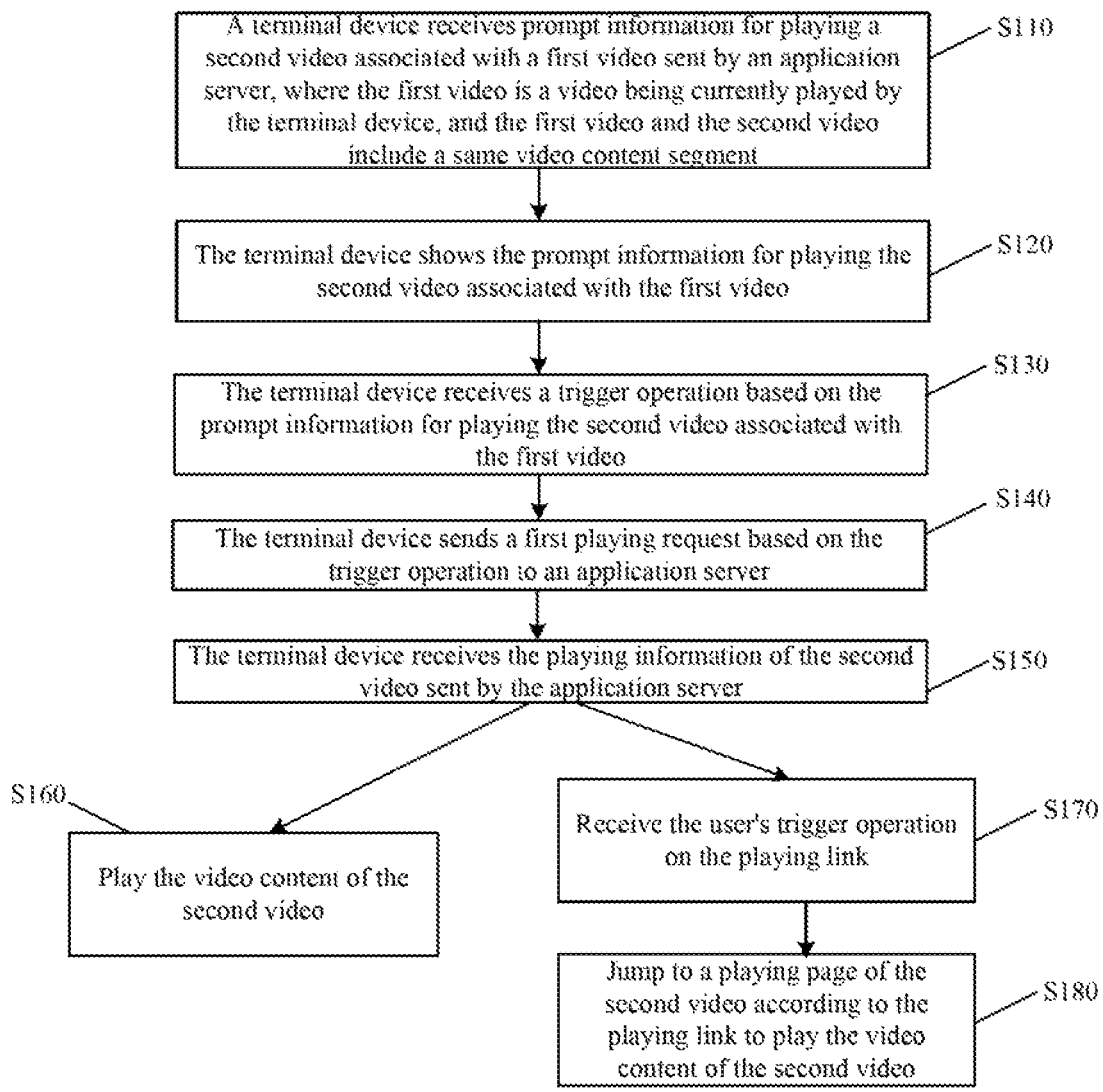
FIG. 5 is a schematic flowchart of another video playing processing method according to an embodiment of the present disclosure.

FIG. 5 is a schematic flowchart of another video playing processing method according to an embodiment of the present disclosure. As shown in FIG. 5, in addition to S110 and S120 in the above embodiment 1, the method further includes the following steps.

In step S130, the terminal device receives a trigger operation based on the prompt information for playing the second video associated with the first video.

In an embodiment, a user may perform a trigger operation through some ways such as an external input device or a touch on the display screen of the terminal device.

In step S140, the terminal device sends a first playing request based on the trigger operation to an application server.

The first playing request includes identification information of the second video.

In step S150, the terminal device receives the playing information of the second video sent by the application server.

In an embodiment, the playing information of the second video includes video content of the second video, and at this time, the following step S160 is performed.

In another embodiment, the playing information of the second video includes a playing link to the second video, and at this time, the following steps S170 and S180 are performed.

In step S160, the video content of the second video is played.

In step S170, the trigger operation of the user on the playing link is received.

In step S180, the terminal device jumps to a playing page of the second video according to the playing link, and plays the video content of the second in the playing page.

In an embodiment, there are different cases of playing the video content of the second video in S160. In an embodiment, the step of playing the video content of the second video includes playing entire video content starting from the start time of the second video, that is, the second video associated with the first video is played from the beginning. In another embodiment, the step of playing the video content of the second video includes playing video content that matches the playing progress of the first video, that is, for the case where the first video and the second video include the same video content segment, the playing progress of the first video may be considered, and if a part of the video content of the same video content segment has been played, the displaying of the same video content segment will be continued for the second video instead of repeating the part of the video content that has been played.

In addition, the case where the first video and the second video include the same video content segment may include two cases: the second video includes the entire video content of the first video, and the second video includes a part of the video content of the first video.

In an embodiment, the playing information of the second video may include description information of the second video, for example, a name of a website where the second video is stored.

In the embodiment of the present disclosure, after the prompt information for playing the second video associated with the first video is displayed on the terminal device, the user may trigger the first playing request based on the prompt information, request to play the second video, and may receive the video content of the second video that matches the playing progress of the first video and sent by the application server. The continued playing of the played content of the first video is realized, and the user experience is further provided.

Embodiment 3

Figure 6:
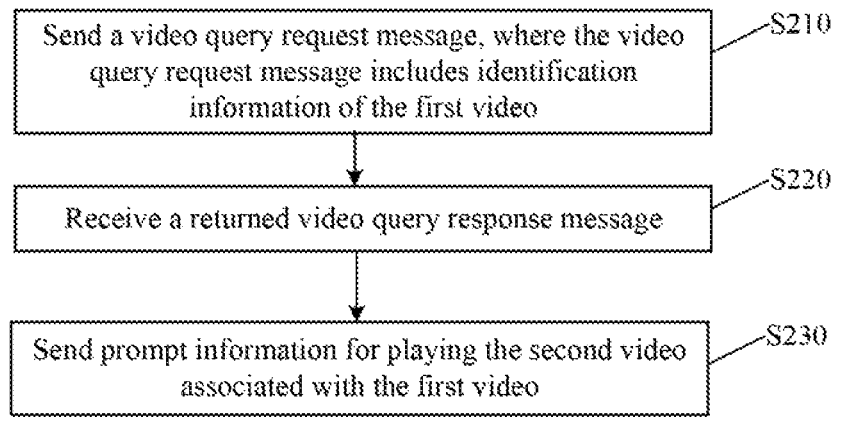
FIG. 6 is a schematic flowchart of yet another video playing processing method according to an embodiment of the present disclosure.

FIG. 6 is a schematic flowchart of yet another video playing processing method according to an embodiment of the present disclosure. The method provided in the embodiment may be applied to an application server. The embodiment is described by taking an example in which identification information of a first video and identification information of a second video are stored in an association server, and as shown in FIG. 6, the method includes steps S210 to S230.

In step S210, a video query request message is sent, where the video query request message includes the identification information of the first video.

In an embodiment, an application server sends the video query request message to an association relationship server, and the video query request message includes the identification information of the first video.

In an embodiment, the first video is a video being currently played by the terminal device, and the video query request message is used to request the association relationship server to query the video having a same video content segment as the first video, that is, the second video mentioned in the following embodiments of the present disclosure. It can be understood that the number of the second video may be one or more.

In step S220, a returned video query response message is received, where the video query response message includes identification information of the second video, and the first video and the second video include the same video content segment.

In an embodiment, the application server receives the video query response message returned by the association relationship server.

The association relationship server is configured to store the correspondence relationship between the identification information of the two videos including the same video content segment. Therefore, the association relationship between the identification information of the first video and the identification of the second video is stored in the association relationship server.

In step S230, prompt information for playing the second video associated with the first video is sent to a terminal device, where the first video is a video being currently played by the terminal device.

In an embodiment, the application server sends the prompt information for playing the second video associated with the first video to the terminal device.

In an embodiment, corresponding to the scenario one and the scenario two in the first embodiment, the method in which the application server sends the prompt information for playing the second video associated with the first video to the terminal device may also at least include any one of the following two scenarios.

In scenario one, when the application server starts to send video content of the first video to the terminal device, the application server sends the prompt information for playing the second video associated with the first video to the terminal device.

In this scenario, the application server may send prompt information for playing the second video associated with the first video to the terminal device while starting to send the video content of the first video to the terminal device. In an embodiment, the prompt information for playing the second video associated with the first video may be sent with the video content of the first video may be sent through a same data channel simultaneously or within an allowable time difference. In another embodiment, the prompt information for playing the second video associated with the first video and the video content of the first video may be sent through different data channels simultaneously or within an allowable time difference. The data channel may be a secure sockets layer (SSL) channel or a transport layer security (TLS) channel. The embodiment of the present disclosure does not limit the data channel.

In scenario two, at a specific time point after the application server sends the video content of the first video to the terminal device, the application server sends the prompt information for playing the second video associated with the first video to the terminal device.

In this scenario, the application server may send prompt information for playing the second video associated with the first video to the terminal device at a specific time point after sending the video content of the first video to the terminal device.

In an embodiment, the step in which at a specific time point after the application server sends the video content of the first video to the terminal device, the application server sends the prompt information for playing the second video associated with the first video to the terminal device includes at least one of the following steps.

When the terminal device pauses the video content of the first video, the application server sends the prompt information for playing the second video associated with the first video to the terminal device.

When the terminal device plays advertisements, the application server sends the prompt information for playing the second video associated with the first video to the terminal device.

When a preset time is remained until an end of playing the video content of the first video, the application server sends the prompt information for playing the second video associated with the first video to the terminal device.

In an embodiment, the selection of the specific time point may be performed according to actual user needs. Exemplarily, the terminal device in the related art usually receives the video content of the first video sent by the application server and plays the video content of the first video for the user, so the application server may send the prompt information for playing the second video associated with the first video to the terminal device when the user pauses playing the video content of the first video; or the application server may send prompt information for playing the second video associated with the first video to the terminal device when the terminal device plays advertisements; or the application server may send prompt information for playing the second video associated with the first video to the terminal device when the terminal device is about to finish playing the video content of the first video (for example, in the last 30 s or 15 s before finishing playing the video content of the first video), which is not specifically limited in the embodiment of the present disclosure.

The embodiment of the present disclosure are described by taking the association relationship of storing the identification information of the first video and the identification information of the second video on the association relationship server as an example, and the above association information may also be stored in the database module of the application server. In the method shown in FIG. 6, a video query request message may be initiated by a playing control module that controls the video playing of the terminal device in the application server, and a video query response message may be returned by a database module of the application server.

In the embodiment of the present disclosure, the association relationship between the identification information of the first video and the identification information of the second video may be established in the association relationship server, or may be formed on other devices or manually input; and in this step, the association server obtains the association relationship from other devices or input devices. In an embodiment, the association relationship between the identification information of the first video and the identification information of the second video is obtained in any one or more of the following possible implementation manners.

In a first implementation manner, the association relationship includes an association relationship between identification information of a first video and identification information of a second video, which is obtained by taking two videos having a same video content segment as the first video and the second video of at least two videos according to video content analysis results of the at least two videos. In an embodiment, the method may be implemented by a separate video content analysis device. The video content analysis device may analyze the video content of at least two videos and obtain two videos including a same video content segment as the first video and the second video respectively, so as to obtain an association relationship between the identification information of the first video and the identification information of the second video. After obtaining the association relationship between the identification information of the first video and the identification information of the second video, the video content analysis device may send the association relationship to the association relationship server, such that the association server obtains the association relationship.

Exemplarily, taking a first video, a second video, and a third video as an example, the video content analysis device analyzes the video content of the first video, the video content analysis device analyzes the video content of the first video, the second video and the third video and learns that the first video and the second video include a same video content segment, the first video and the third video do not include a same video content segment, the second video and the third video do not include a same video content segment. Therefore, the video content analysis device establishes and stores an association relationship between the identification information of the first video and the identification information of the second video, and sends the association relationship between the identification information of the first video and the identification information of the second video to the association relationship server.

In an embodiment, the above-mentioned analysis on at least two video contents to obtain the same video content segment may be to perform frame extraction on the videos to be analyzed to obtain multiple frame images, and then extract multiple types of image features of each frame image, where the type of the image features is not limited, and at this time, multiple image features capable of characterizing image features may be obtained; then, determine video features of the videos to be analyzed according to each image features of the same type of the multiple frame images of the videos to be analyzed, for example, the multiple image features may be arranged according to the sequence of the corresponding frame images in the videos to obtain the video features, so that multiple types of video features may be obtained; and finally, perform sequence comparison on the video to be analyzed according to the obtained various video features to obtain the similarity degree of the videos to be analyzed, set a threshold value for the similarity degree, and consider that the two videos participating in the analysis include the same video content segment only when the similarity degree is greater than the preset threshold value.

In a second implementation manner, the association relationship may be an association relationship between identification information of a first video and identification information of a second video, which is obtained according to an operation of video partitioning on the second video according to the video partitioning technology to obtain the first video. That is, in this implementation manner, a video partitioning device may also be provided to perform video partitioning. For example, the second video is partitioned to obtain the first video. Since the first video is part of the second video, the two certainly include a same video content fragment. At this time, the association relationship between the identification information of the first video and the identification information of the second video may be established during the partitioning, and the video partitioning device may send the above-mentioned association relationship to the association relationship server, such that the association relationship server acquires the association relationship.

Exemplarily, taking the second video is a movie A as an example, after entire video content of the movie A is obtained, in order to meet different playing requirements of the user, a video partitioning device may be used to perform video partitioning on a wonderful video part of the second video to get the first video. It can be seen that the first video and the second video certainly include a same video content segment, and the association relationship between the identification information of the first video and the identification information of the second video may be directly obtained during partitioning, and the association relationship is sent to the association relationship server.

In a third implementation manner, the association relationship may be an association relationship between identification information of a first video and identification information of a second video input by a first video upload user. That is, when a video upload user uploads a video, the video upload user input an association relationship between the uploaded video and an existing video resource. For example, when a copyright owner of the movie A is doing promotion, the copyright owner often selects some wonderful pictures for the promotion, and the wonderful pictures are also part of the entire video content of the movie A. When the copyright owner of the movie A uploads a promotion video, the association relationship between the identification information of the promotion video and the identification information of the movie A may be input at the same time.

In a fourth implementation manner, the association relationship may be obtained from a video association relationship list. In an embodiment, the association relationship list may be formed on other devices. For example, the association relationship list may be formed and stored on the above-mentioned video partitioning device; or the association relationship list may plotted artificially after a person watches a large number of videos and learns the video content; or the association relationship list may be obtained directly from a partner. After the association relationship list is provided to the association relationship server, the association relationship server obtains the association relationship.

When the above association relationship is generated, the positioning information of the same video content segment in the first video and the second video may be recorded together. When the association relationship is stored, in addition to the association relationship between the identification information of the first video and the identification information of the second video, the positioning information of the same video content segment in the first video and the second video may also be stored. The positioning information may include but is not limited to at least one of: time information, video frame information, or audio frame information.

Embodiment 4

Based on the above embodiments of the present disclosure, the application server may also receive a first playing request for requesting to play the second video, and feed back playing information of the second video to the terminal device.

Figure 7:
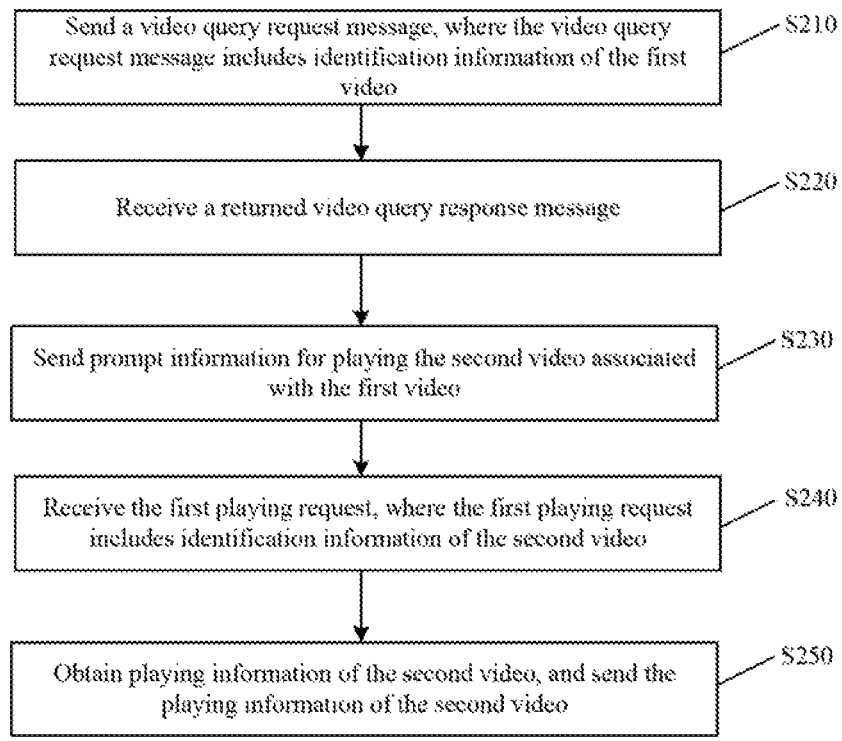
FIG. 7 is a schematic flowchart of yet another video playing processing method according to an embodiment of the present disclosure.

FIG. 7 is a schematic flowchart of yet another video playing processing method according to an embodiment of the present disclosure. As shown in FIG. 7, in addition to steps S210 to S230 shown in FIG. 6 above, steps S240 to S250 are also included.

In step S240, the application server receives the first playing request sent by the terminal device, where the first playing request includes identification information of the second video.

In step S250, the application server obtains playing information of the second video, and sends the playing information of the second video to the terminal device.

In an embodiment, the playing information of the second video includes video content of the second video, and the step S250 may include: obtaining the video content of the second video from the video storage server according to the identification information of the second video, and sending the video content of the second video to the terminal device.

In an embodiment, the playing information of the second video includes a playing link to the second video, and the step S250 may include: obtaining the playing link to the second video from the playing link list according to the identification information of the second video, and sending the playing link to the second video to the terminal device.

In an embodiment, the playing link list may be generated on other devices or formed by manual operation input, or may be established on an application server.

For the above-mentioned first case that the playing information of the second video is the video content of the second video, there may also be two cases.

First, entire video content starting from a start time of the second video is sent to the terminal device, that is, the second video is played again from the beginning on the terminal device.

Second, the playing content of the second video sent to the terminal device is video content that matches the playing progress of the first video. The video content that matches the playing progress of the first video is obtained according to the playing progress of the first video and the positioning information of the same video content segment in the first video and/or the second video. The matching of the video content of the second video with the playing progress of the first video on the terminal device can be realized according to the playing progress of the first video on the terminal device, and the continued playing of the video content may be realized on the terminal device. That is, the video content that matches the playing progress of the first video includes: video content for continued playing obtained based on the playing progress of the first video, and at least one of positioning information of the same video content segment in the first video or positioning information of the same video content segment in the second video. Video content that matches the playing progress of the first video includes video content for continued playing.

Embodiment 5

Figure 8:
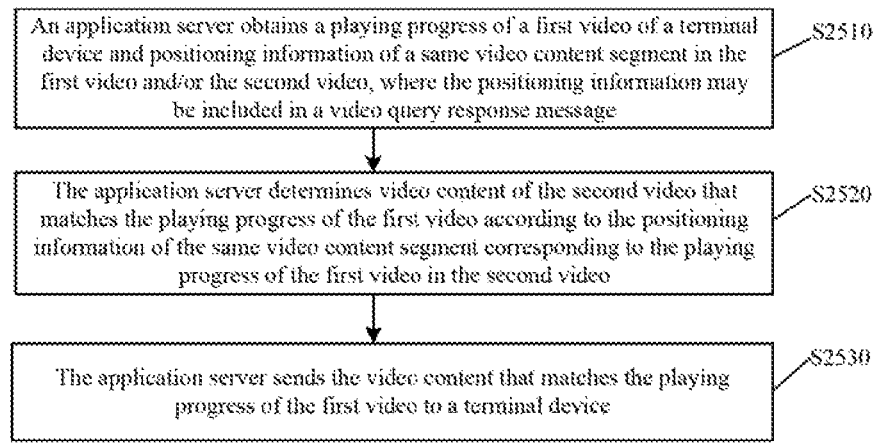
FIG. 8 is a schematic flowchart of yet another video playing processing method according to an embodiment of the present disclosure.

FIG. 8 is a schematic flowchart of yet another video playing processing method according to an embodiment of the present disclosure. As shown in FIG. 8, at this time, the above step S250 may include steps S2510 to S2530.

In S2510, the application server obtains the playing progress of the first video of the terminal device and the positioning information of the same video content segment in the first video and/or the second video. The positioning information may be included in a video query response message.

In an embodiment, when the video is played on the terminal device, the application server and the terminal device will interact with the playing progress of the video in real time. For the case that the terminal device is playing the first video in the embodiment, the play control module on the application server may detect the playing progress of the first video. The positioning information may be stored in the association relationship server together with the association relationship between the identification information of the first video and the identification information of the second video, and may be obtained by sending a positioning information acquisition request separately, or the video query response message received in step S220 of the above embodiment includes the positioning information of the same video content segment in the first video and/or second video, and at this time, it is not necessary to separately send the positioning information acquisition request. In an embodiment, the positioning information includes any one or combination of time stamp information, video frame information, and audio frame information, or the above positioning information may also be any other information that can achieve positioning operations, which is not specifically limited in the embodiments of the present disclosure.

The time stamp information refers to the time correlation between the same video content segment and the first video and/or the second video; the time stamp information may include at least the reference time of the same video content segment in the first video and/or the second video. The reference time may be the start time or end time of the video, or other time points that can serve as a reference; that is, when the same video content segment starts in the first video and/or the second video, for example, the length of the second video is 30 minutes, the length of the same video content segment is 2 minutes, and the same video content segment starts from the 15th minute in the second video. Exemplarily, the length of the first video may be 20 minutes, and the same video content segment starts from the 10th minute in the first video. In the embodiment of the present disclosure, when the same video content segment includes all content segments of the first video, for example, the length of the first video is also 2 minutes, and the first video also starts from the 15th minute of the second video.

As an important part of video content, a video frame may also characterize the position of the same video content segment in the first video and the second video; the video frame information includes at least a reference video frame of the same video content segment in the first video and/or the second video. The reference video frame may be the start video frame or the end video frame of the video frame, or other video frames that can be used as a reference; for example, the total number of video frames of the second video is a positive integer M, the total number of video frames of the same video content segment is a positive integer N, N is less than or equal to M, and the same video content segment starts from the Ith frame in the second video, where I is a positive integer.

In an embodiment, the total number of video frames of the first video may be a positive integer L, and the same video content segment starts from the Jth frame in the first video, where J is a positive integer. In the embodiment of the present disclosure, when the same video content segment includes all content segments of the first video, for example, the total number of video frames of the first video is a positive integer N, and the first video also starts from the Ith frame of the second video.

As an important part of video content, an audio frame may also characterize the position of the same video content segment in the first video and the second video; the audio frame information includes a reference audio frame of the same video content segment in the first video and/or the second video. The reference audio frame may be the start audio frame or the end audio frame of the audio frame, or other audio frames that may be used as a reference; for example, the total number of audio frames of the second video is a positive integer M, the total number of video frames of the same video content segment is a positive integer N, N is less than or equal to M, and the same video content segment starts from the Ith frame in the second video, where I is a positive integer.

In an embodiment, the total number of audio frames of the first video may be a positive integer L, and the same video content segment starts from the Jth frame in the first video, where J is a positive integer. In the embodiment of the present disclosure, when the same video content segment includes all content segments of the first video, for example, the total number of audio frames of the first video is a positive integer N, and the first video also starts from the Ith frame of the second video.

In S2520, the application server determines the video content of the second video that matches the playing progress of the first video according to the positioning information of the same video content segment in the second video, the same video content segment corresponding to the playing progress of the first video, that is, the content of the start playing when the continued playing is performed, so that the function of accurate continued playing can be achieved.

In an embodiment, according to the playing progress of the first video, and the positioning information of the same video content segment in the first video and/or the second video, positioning information of the same video content segment, which corresponds to the playing progress of the first video in the second video is determined.

For example, the length of the second video is 60 minutes, the length of the same video content segment is 5 minutes, the same video content segment starts from the 10th minute in the second video, the length of the first video is 10 minutes, the same video content segment starts from the 5th minute in the first video, when the playing progress of the first video is 6 minutes, it may be determined that the content of the same video content segment in the 1st minute is being played, if the second video is continuously played, the video content of the second video in the 11th minute should be played, that is, based on the start time of the same video content segment in the first video and the start time of the second video, it may be calculated when the second video starts to be played based on the playing progress of the first video. The above description uses positioning information as time stamp information as an example. Other positioning information, such as video frame information and audio frame information, is also applicable.

In S2530, the application server sends the video content that matches the playing progress of the first video to the terminal device.

In the embodiment of the present disclosure, the second video may include entire video content segments of the first video; or the first video may include entire video content segments of the second video. In the embodiment of the present disclosure, the case that the positioning information is stored in the association relationship server is taken as an example for description; however, the positioning information, as well as the association relationship, may be stored in the database module of the application server, and the module that generally performs video playing control in the application server is a playing control module, and the playing control module may obtain the playing progress of the video on the terminal device and the positioning information, and then may calculate the start playing content of the second video according to the playing progress and the positioning information, thereby achieving the technical effect of continued playing. For the above-mentioned execution body that calculates the start playing content of the second video according to the playing progress and the positioning information, there is no limitation in the embodiments of the present disclosure, besides the above-mentioned playing control module, the execution body may also be other modules of the application server or other servers. For example, the execution may be on the association server. In an embodiment, the video query request message may include the playing progress of the first video, and the video query response message may include the positioning information of the playing progress of the first video in the second video, where the positioning information of the playing progress of the first video in the second video is determined based on the playing progress of the first video, the positioning information of the same video content segment in the first video and/or the positioning information in the second video, and the video content of the second video matched with the playing progress of the first video is determined based on the positioning information of the playing progress in the second video.

Embodiment 6

Figure 9:
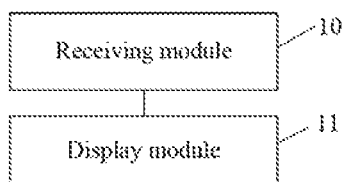
FIG. 9 is a schematic structural diagram of a terminal device according to an embodiment of the present disclosure.

FIG. 9 is a schematic structural diagram of a terminal device according to an embodiment of the present disclosure. The terminal device includes: a receiving module 10 and a display module 11.

The receiving module 10 is configured to receive prompt information for playing a second video associated with a first video sent by an application server, where the first video is a video being currently played, and the first video and the second video include a same video content segment.

The display module 11 is configured to show the prompt information for playing the second video associated with the first video.

In an embodiment, the receiving module 10 is configured to receive the prompt information for playing the second video associated with the first video sent by the application server when starting to receive the video content of the first video sent by the application server; or at a specific time point after receiving the video content of the first video sent by the application server, receive the prompt information for playing the second video associated with the first video sent by the application server.

In an embodiment, the receiving module 10 is configured to perform at least one of the following functions.

When the video content of the first video is paused, the receiving module 10 receives the prompt information for playing the second video associated with the first video sent by the application server.

When advertisements are played, the receiving module 10 receives the prompt information for playing the second video associated with the first video sent by the application server.

When a preset time is remained until an end of playing the video content of the first video, the receiving module 10 receives the prompt information for playing the second video associated with the first video sent by the application server.

In an embodiment, the display module 11 is configured to display prompt information for playing the second video associated with the first video on a playing page of the first video; or pop up a prompt bar during playing the first video, where the prompt bar includes prompt information for playing the second video associated with the first video.

Figure 10:
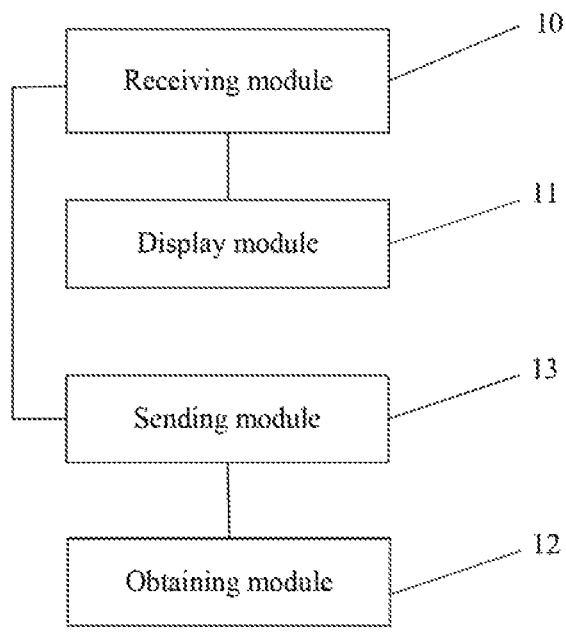
FIG. 10 is a schematic structural diagram of another terminal device according to an embodiment of the present disclosure.

In an embodiment, in conjunction with FIG. 9, FIG. 10 is a schematic structural diagram of another terminal device according to an embodiment of the present disclosure, further including: an obtaining module 12 and a sending module 13.

The obtaining module 12 is configured to receive a trigger operation based on the prompt information for playing the second video associated with the first video.

The sending module 13 is configured to send a first playing request based on the trigger operation to the application server, where the first playing request includes identification information of the second video.

The receiving module 10 is further configured to receive the playing information of the second video sent by the application server.

Figure 11:
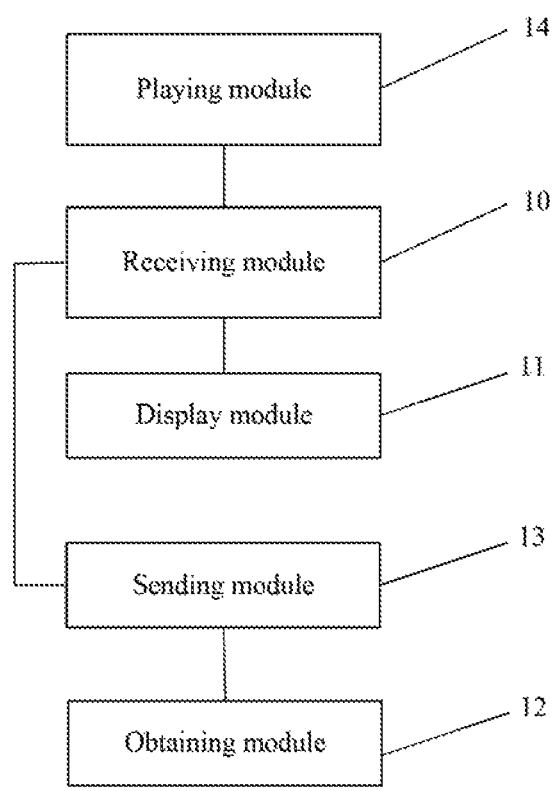
FIG. 11 is a schematic structural diagram of yet another terminal device according to an embodiment of the present disclosure.

In an embodiment, in conjunction with FIG. 10, FIG. 11 is a schematic structural diagram of yet another terminal device according to an embodiment of the present disclosure, further including: a playing module 14.

When the playing information of the second video includes video content of the second video, the playing module 14 is configured to play the video content of the second video.

When the playing information of the second video includes a playing link to the second video, the playing module 14 is configured to jump to a playing page of the second video and play the video content of the second video in the playing page after the receiving module receives the trigger operation on the playing link.

In an embodiment, the step in which the playing module 14 plays the video content of the second video includes playing entire video content starting from a start time of the second video.

In an embodiment, the step in which the playing module 14 plays the video content of the second video includes playing video content that matches a playing progress of the first video.

In an embodiment, the video content that matches the playing progress of the first video includes: video content for continued playing obtained based on the playing progress of the first video, and at least one of positioning information of the same video content segment in the first video or positioning information of the same video content segment in the second video.

In an embodiment, the second video includes entire video content segments of the first video.

Or the second video includes part of video content segments of the first video.

The above terminal device provided by the embodiment of the present disclosure can execute the steps performed by the terminal device in the video playing processing method provided by the method embodiment of the present disclosure, and has the corresponding functional modules and effects of the execution method.

Embodiment 7

Figure 12:
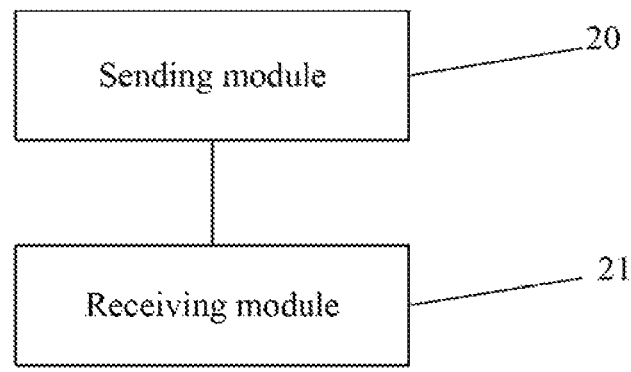
FIG. 12 is a schematic structure diagram of an application server according to an embodiment of the present disclosure.

FIG. 12 is a schematic structural diagram of an application server according to an embodiment of the present disclosure. The application server includes: a sending module 20 and a receiving module 21.

The sending module 20 is configured to send a video query request message to an association relationship server, where the video query request message includes identification information of a first video.

The receiving module 21 is configured to receive a video query response message returned by the association relationship server, where the video query response message includes identification information of a second video, and the first video and the second video include a same video content segment.

The sending module 20 is further configured to send prompt information for playing the second video associated with the first video to a terminal device, where the first video is a video being currently played by the terminal device.

In an embodiment, the sending module 20 is configured to send the prompt information for playing the second video associated with the first video to the terminal device when starting to send the video content of the first video to the terminal device; or at a specific time point after sending the video content of the first video to the terminal device, send the prompt information for playing the second video associated with the first video to the terminal device.

In an embodiment, the sending module 20 is configured to perform at least one of the following functions.

When the terminal device pauses the video content of the first video, the sending module 20 sends the prompt information for playing the second video associated with the first video to the terminal device.

When the terminal device plays advertisements, the sending module 20 sends the prompt information for playing the second video associated with the first video to the terminal device.

When a preset time is remained until an end of playing the video content of the first video, the sending module 20 sends the prompt information for playing the second video associated with the first video to the terminal device.

Figure 13:
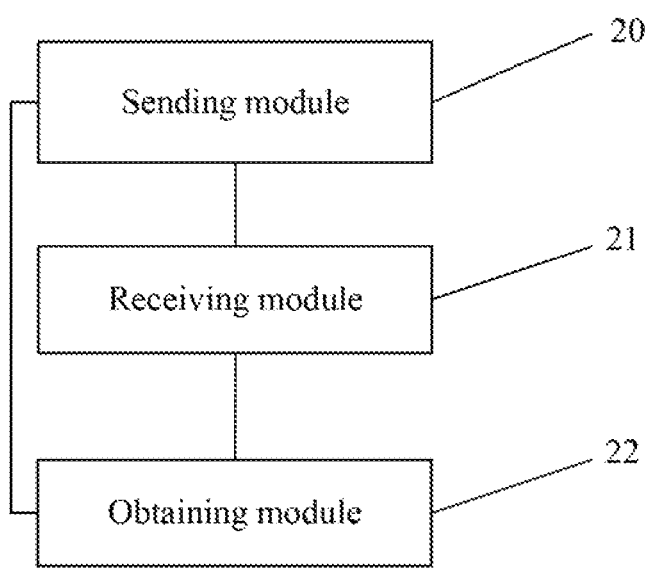
FIG. 13 is a schematic structural diagram of another application server according to an embodiment of the present disclosure.

In an embodiment, in conjunction with FIG. 12, FIG. 13 is a schematic structural diagram of another application server according to an embodiment of the present disclosure, further including: an obtaining module 22.

The receiving module 21 is further configured to receive the first playing request sent by the terminal device, where the first playing request includes identification information of the second video.

The obtaining module 22 is configured to obtain the playing information of the second video.

The sending module 20 is further configured to send the playing information of the second video to the terminal device.

In an embodiment, when the playing information of the second video includes video content of the second video, the obtaining module 22 is configured to obtain the video content of the second video from the video storage server according to the identification information of the second video; and the sending module 20 is configured to send the video content of the second video to the terminal device.

When the playing information of the second video includes a playing link to the second video, the obtaining module 22 is configured to obtain the playing link to the second video from a playing link list according to the identification information of the second video; and the sending module 20 is configured to send the playing link to the second video to the terminal device.

In an embodiment, the sending module 20 is configured to send entire video content starting from a start time of the second video to the terminal device.

In an embodiment, the sending module 20 is configured to send the playing content of the second video to the terminal device as the video content that matches the playing progress of the first video. The video content that matches the playing progress of the first video includes video content for continued playing obtained by the playing progress of the first video, and positioning information of the same video content segment in the first video and/or the second video.

In an embodiment, the obtaining module 22 is configured to obtain the positioning information of the same video content segment in the first video and/or the second video, the positioning information of the same video content segment in the first video and/or the second video may be included in the video query response message, and the positioning information of the same video content segment, which corresponds to the playing progress of the first video, in the second video is determined according to the playing progress of the first video and the positioning information of the same video content segment in the first video and/or the second video. The sending module 20 is further configured to determine video content of the second video that matches the playing progress of the first video based on the positioning information of the same video content segment, the same video content segment corresponding to the playing progress of the first video in the second video.

In an embodiment, the video query request message sent by the sending module 20 further includes the playing progress of the first video.

The video query response message received by the receiving module 21 further includes the positioning information of the same video content segment, which corresponds to the playing progress of the first video, in the second video, where the positioning information of the same video content segment, which corresponds to the playing progress of the first video, in the second video is determined based on the playing progress of the first video, and the positioning information of the same video content segment in the first video or the positioning information in the second video. The sending module 20 is further configured to determine video content of the second video that matches the playing progress of the first video based on the positioning information of the same video content segment in the second video, the same video content segment corresponding to the playing progress of the first video.

In an embodiment, the positioning information includes any one or a combination of time stamp information, video frame information, and audio frame information.

In an embodiment, the second video includes entire video content segments of the first video; or the second video includes part of video content segments of the first video.

The above application server provided by the embodiment of the present disclosure can execute the steps performed by the application server in the video playing processing method provided by the method embodiment of the present disclosure, and has the corresponding functional modules and effects of the execution method.

Embodiment 8

Figure 14:
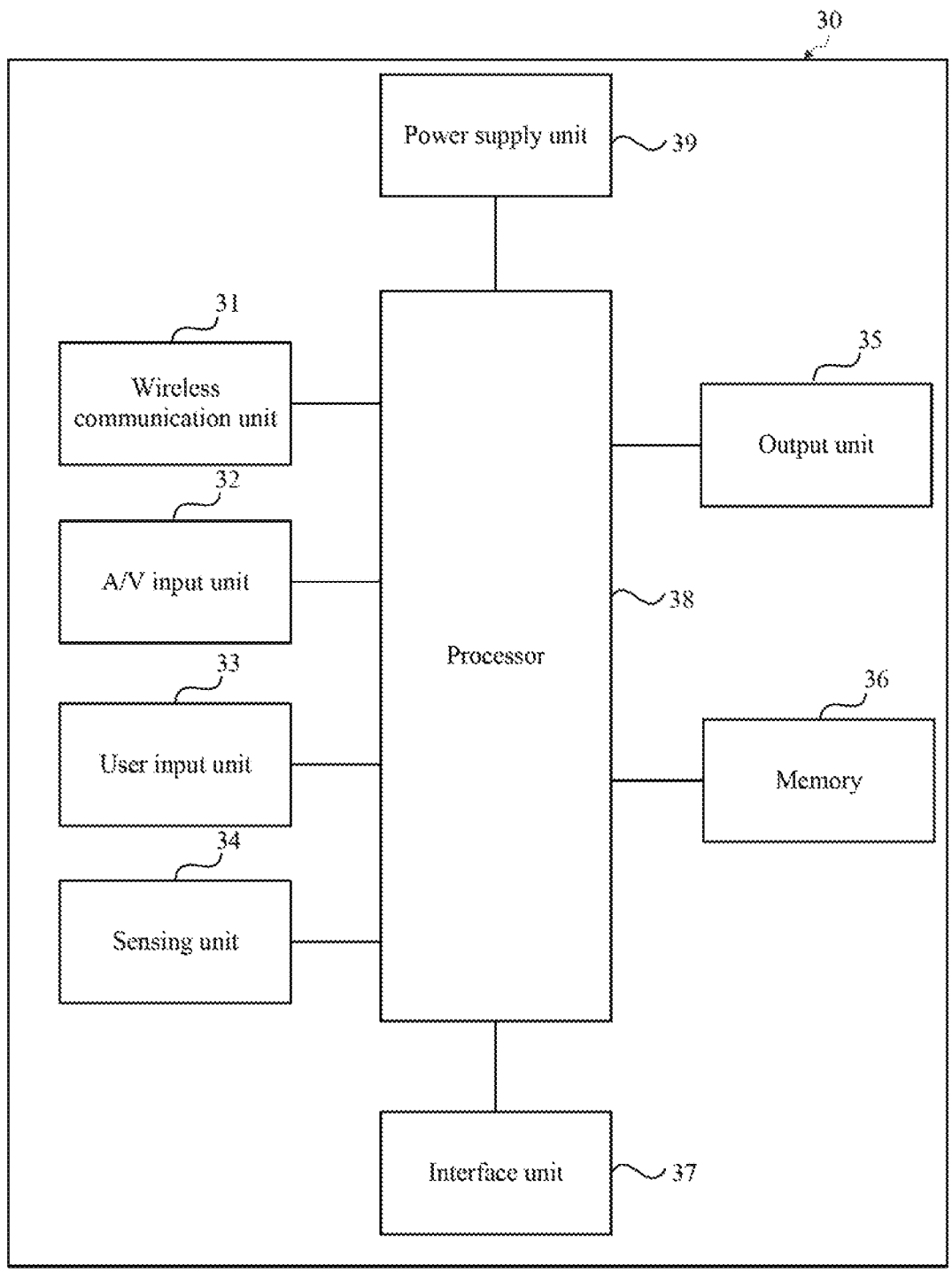
FIG. 14 is a schematic structural diagram of yet another terminal device according to an embodiment of the present disclosure.

FIG. 14 is a schematic structural diagram of yet another terminal device according to an embodiment of the present disclosure. The terminal device may be implemented in one or more forms, and the terminal device in the present disclosure may include, but is not limited to, such as a mobile phone, a smart phone, a notebook computer, a digital broadcast receiver, a personal digital assistant (PDA), a portable device (PAD), a portable multimedia player (PMP), a navigation device, an in-vehicle terminal equipment, an in-vehicle display terminal, an in-vehicle electronic rear-view mirror, a mobile terminal equipment such as digital television (TV), a desktop computer and other fixed terminal device.

As shown in FIG. 14, the terminal device 30 may include a wireless communication unit 31, an audio/video (A/V) input unit 32, a user input unit 33, a sensing unit 34, an output unit 35, a memory 36, an interface unit 37, a processor 38, a power supply unit 39, etc. FIG. 12 shows a terminal device including various components, but it should be understood that implementation of all shown components is not required. More or fewer components may be implemented instead.

The wireless communication unit 31 allows radio communication between the terminal device 30 and a wireless communication system or network. The A/V input unit 32 is configured to receive an audio or video signal. The user input unit 33 may generate key input data according to a command input by the user to control one or more operations of the terminal device. The sensing unit 34 detects the current state of the terminal device 30, the location of the terminal device 30, the presence or absence of a user's touch input to the terminal device 30, the orientation of the terminal device 30, the acceleration or deceleration movement and direction of the terminal device 30, and the like, and generates a command or signal for controlling the operation of the terminal device 30. The interface unit 37 is configured to be an interface through which at least one external device can be connected to the terminal device 30. The output unit 35 is configured to provide output signals in a visual, audio, and/or tactile manner. The memory 36 may store software programs for processing and controlling operations executed by the processor 38, or the like, or may temporarily store data that has been or will be output. The memory 36 may include at least one type of storage medium. Also, the terminal device 30 may cooperate with a network storage device that performs the storage function of the memory 36 through a network connection. The processor 38 generally controls the overall operation of the terminal device. In addition, the processor 38 may include a multimedia module for reproducing or playing multimedia data. The processor 38 may perform pattern recognition processing to recognize a handwriting input or a picture drawing input performed on the touch screen as characters or images. The power supply unit 39 receives external power or internal power and supplies the appropriate power required for one or more elements and components under the control of the controller 38.

The processor 38 executes one or more functional applications and data processing by running the program stored in the memory 36, for example, to implement the method described in any of the above embodiments of the embodiments of the present disclosure.

Embodiment 9

Figure 15:
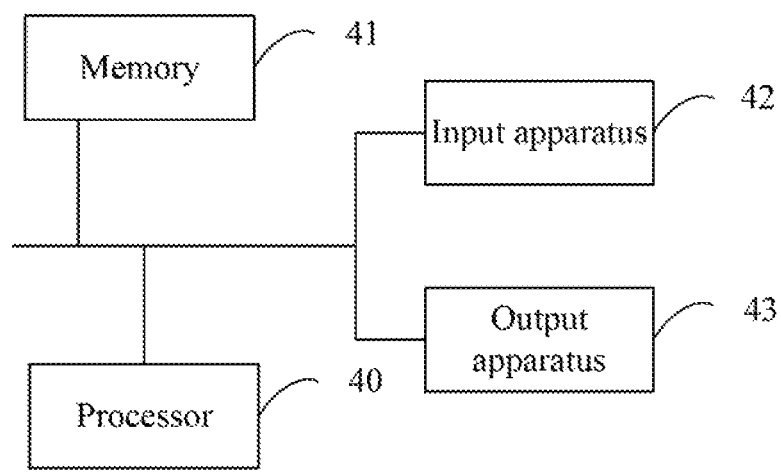
FIG. 15 is a schematic structure diagram of a server according to an embodiment of the present disclosure.

FIG. 15 is a schematic structural diagram of a server provided by an embodiment of the present disclosure. As shown in FIG. 15, the server includes a processor 40, a memory 41, an input apparatus 42, and an output apparatus 43; the number of processors 40 in the server may be one or more, one processor 40 is taken as an example in FIG. 13; the processor 40, the memory 41, the input apparatus 42 and the output apparatus 43 in the server may be connected through a bus or in other manners, and FIG. 13 is taken as an example through a bus. The bus represents one or more of several types of bus structures, including a memory bus or memory controller, a peripheral bus, an accelerated graphics port, and a processor or a local bus using any of a variety of bus architectures.

The memory 41, as a computer-readable storage medium, may be configured to store software programs, computer executable programs, and modules, such as program instructions/modules corresponding to the video playing processing method in the embodiments of the present disclosure. The processor 40 runs the software programs, instructions and modules stored in the storage 41 to execute one or more function applications and data processing of the server, that is, to implement the methods described above.

The memory 41 may include a program storage region and a data storage region, where the program storage region may store an operating system and an application program required by at least one function, and the data storage region may store data created depending on use of a terminal device. In addition, the memory 41 may include a high speed random access memory, and may also include a nonvolatile memory, such as at least one magnetic disk storage device, a flash device or another nonvolatile solid state storage device. In some examples, the memory 41 may further include memory remotely located relative to the processor 40, and the memory may be connected to the server over a network. Examples of the preceding network include, but are not limited to, the Internet, an intranet, a local area network, a mobile communication network and a combination thereof.

The input apparatus 42 may be configured to receive inputted digital or character information, and generate key signal input related to user settings and function control of the server. The output apparatus 43 may include a display device such as a display screen.

Embodiment 10

An embodiment of the present disclosure further provides a computer-readable storage medium on which a computer program is stored, where the computer program is executed by a processor to implement the method described in any of the above embodiments.

The computer storage medium of the embodiment of the present disclosure may employ any combination of one or more computer-readable media. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any combination thereof. The computer-readable storage media include (non-exhaustive lists): electrical connection with one or more wires, a portable computer magnetic disk, a hard disk, a random access memory (RAM), a read only memory (ROM), an erasable programmable read only memory (EPROM), a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program that may be used by or may be used in connection with an instruction execution system, apparatus, or device.

The computer-readable signal medium may include a data signal that is propagated in the baseband or as part of a carrier, where a computer-readable program code is carried. Such propagated data signal may take a variety of forms including, but not limited to, an electromagnetic signal, an optical signal, or any suitable combination thereof. The computer-readable signal medium may also be any computer-readable medium other than a computer-readable storage medium, and the computer-readable medium may send, propagate, or transmit a program used by or used in connection with the instruction execution system, apparatus, or device.

The program code included on a computer-readable medium may be transmitted by any suitable medium, including but not limited to wireless, wire, optical fiber cable, radio frequency (RF), and the like, or any suitable combination thereof.

The computer program code for performing the operations of the present disclosure may be written in one or more programming languages or a combination thereof, and the programming languages include an object-oriented programming language such as Java, Smalltalk, C++ and a conventional procedure-oriented programming language such as the "C" language or similar programming languages. The program code may be executed entirely on the user's computer, partly on the user's computer, as a stand-alone software package, partly on the user's computer and partly on a remote computer, or entirely on the remote computer or server. In the case of involving the remote computer, the remote computer may be connected to the user's computer via any kind of network, including a local area network (LAN) or a wide area network (WAN), or may be connected to an external computer (e.g., via the Internet provided by an Internet service provider).

From the description of the embodiment described above, it will be apparent to those skilled in the art that the disclosure may be implemented by software plus a general hardware platform, or may be implemented by hardware. Based on such understanding, the embodiments of the present disclosure may be embodied in the form of a software product in essence or part of contributions to related technologies. The computer software product is stored in a computer-readable storage medium such as a computer floppy disk, a read-only memory (ROM), a random access memory (RAM), a flash, a magnetic disk or an optical disk and includes multiple instructions for enabling a computer device (which may be a personal computer, a server, or a network device) to execute the method described according to one or more embodiments of the present disclosure.

In the above embodiment of the search device, the included units and modules are only divided according to the function logic, but are not limited to the above division, as long as the corresponding functions are achieved; in addition, the name of each functional unit is only for the purpose of distinguishing each other, and is not used to limit the protection scope of the present disclosure.

What is claimed is:

1. A video playing processing method, comprising:
receiving prompt information for playing a second video associated with a first video sent by an application server, wherein the first video is a video being currently played, and the first video and the second video comprise a same video content segment, and at least one of the first video or the second video contain a video segment different from the same video content segment;
showing the prompt information for playing the second video associated with the first video; and
playing video content of the second video;
wherein playing the video content of the second video comprises:
playing video content of the second video that matches a playing progress of the first video based on the playing progress of the first video and positioning information of the same video content segment in the first video and positioning information of the same video content segment in the second video, wherein the positioning information is used to represent start time or a position of the same video content segment in the first video and the second video.

2. The method of claim 1, wherein receiving the prompt information for playing the second video associated with the first video sent by the application server comprises one of:
in a case of starting to receive video content of the first video sent by the application server, receiving the prompt information for playing the second video associated with the first video sent by the application server; or
at a specific time point after receiving video content of the first video sent by the application server, receiving the prompt information for playing the second video associated with the first video sent by the application server.

3. The method of claim 1, wherein showing the prompt information for playing the second video associated with the first video comprises one of:
displaying the prompt information for playing the second video associated with the first video on a playing page of the first video; or
popping up a prompt bar during playing the first video, wherein the prompt bar comprises the prompt information for playing the second video associated with the first video.

4. The method of claim 1, further comprising:
receiving a trigger operation based on the prompt information for playing the second video associated with the first video;
sending a first playing request based on the trigger operation to the application server, wherein the first playing request comprises identification information of the second video; and
receiving playing information of the second video sent by the application server.

5. The method of claim 4, wherein
in a case where the playing information of the second video comprises video content of the second video, the method further comprises:
playing the video content of the second video; or
in a case where the playing information of the second video comprises a playing link to the second video, the method further comprises:
after receiving a trigger operation on the playing link, jumping to a playing page of the second video, and playing the video content of the second video in the playing page.

6. The method of claim 5, wherein playing the video content of the second video comprises:
playing entire video content starting from a start time of the second video,
wherein the second video comprises entire video content segments of the first video or part of video content segments of the first video.

7. The method of claim 5, wherein playing the video content of the second video comprises playing video content that matches a playing progress of the first video.

8. The method of claim 7, wherein the video content that matches the playing progress of the first video comprises video content for continued playing obtained based on the playing progress of the first video, and at least one of positioning information of the same video content segment in the first video or positioning information of the same video content segment in the second video.

9. The method of claim 2, wherein at a specific time point after receiving video content of the first video sent by the application server, receiving the prompt information for playing the second video associated with the first video sent by the application server comprises at least one of:
   in a case of pausing the video content of the first video, receiving the prompt information for playing the second video associated with the first video sent by the application server;
   in a case of playing advertisements, receiving the prompt information for playing the second video associated with the first video sent by the application server; or
   in a case of a preset time remaining until an end of playing the video content of the first video, receiving the prompt information for playing the second video associated with the first video sent by the application server.

10. A video playing processing method, comprising:
   sending a video query request message, wherein the video query request message comprises identification information of a first video;
   receiving a returned video query response message, wherein the video query response message comprises identification information of a second video, and the first video and the second video comprise a same video content segment, and at least one of the first video or the second video contain a video segment different from the same video content segment;
   sending prompt information for playing the second video associated with the first video to a terminal device, wherein the first video is a video being currently played by the terminal device; and
   sending video content of the second video to the terminal device;
   wherein sending the video content of the second video to the terminal device comprises:
   sending the video content of the second video that matches a playing progress of the first video to the terminal device, wherein the video content that matches the playing progress of the first video is obtained based on the playing progress of the first video, and positioning information of the same video content segment in the first video and positioning information of the same video content segment in the second video, the positioning information is used to represent start time or a position of the same video content segment in the first video and the second video.

11. The method of claim 10, wherein sending prompt information for playing the second video associated with the first video to the terminal device comprises one of:
   in a case of starting to send video content of the first video to the terminal device, sending the prompt information for playing the second video associated with the first video to the terminal device; or
   at a specific time point after sending video content of the first video to the terminal device, sending the prompt information for playing the second video associated with the first video to the terminal device.

12. The method of claim 10, further comprising:
   receiving a first playing request sent by the terminal device, wherein the first playing request comprises identification information of the second video; and
   obtaining playing information of the second video, and sending the playing information of the second video to the terminal device.

13. The method of claim 12, wherein
   in a case where the playing information of the second video comprises video content of the second video, obtaining the playing information of the second video and sending the playing information of the second video to the terminal device comprises:
   obtaining the video content of the second video from a video storage server according to the identification information of the second video, and sending the video content of the second video to the terminal device; or
   in a case where the playing information of the second video comprises a playing link to the second video, the acquiring playing information of the second video and sending the playing information of the second video to the terminal device comprises:
   obtaining the playing link to the second video from a playing link list according to the identification information of the second video, and sending the playing link to the second video to the terminal device.

14. The method of claim 13, wherein the sending of the video content of the second video to the terminal device comprises:
   sending entire video content starting from a start time of the second video to the terminal device.

15. The method of claim 13, wherein sending the video content of the second video to the terminal device comprises:
   sending the terminal device video content of the second video that matches a playing progress of the first video, wherein the video content that matches the playing progress of the first video comprises video content for continued playing obtained based on the playing progress of the first video, and at least one of positioning information of the same video content segment in the first video or positioning information of the same video content segment in the second video.

16. The method of claim 15, further comprising:
   acquiring at least one of following information of the same video content segment: positioning information of the same video content segment in the first video; or positioning information of the same video content segment in the second video;
   determining positioning information of the same video content segment in the second video, according to following information: the playing progress of the first video, and at least one of the positioning information of the same video content segment in the first video or the positioning information of the same video content segment in the second video; and
   wherein sending the video content of the second video to the terminal device comprises:
   determining the video content of the second video that matches the playing progress of the first video based on the positioning information of the same video content segment in the second video,
   wherein the same video content segment corresponds to the playing progress of the first video.

17. The method of claim 15, wherein the video query request message further comprises the playing progress of the first video;

the video query response message further comprises the positioning information of the same video content segment in the second video, wherein the positioning information of the same video content segment corresponding to the playing progress of the first video in the second video is determined based on the playing progress of the first video, and at least one of the positioning information of the same video content segment in the first video or the positioning information of the same video content segment in the second video; and wherein sending the video content of the second video to the terminal device comprises:

determining the video content of the second video that matches the playing progress of the first video based on the positioning information of the same video content segment in the second video, wherein the same video content segment corresponds to the playing progress of the first video.

18. The method of claim 15, wherein the positioning information comprises at least one of: time stamp information, video frame information, or audio frame information.

19. The method of claim 11, wherein at a specific time point after sending video content of the first video to the terminal device, sending the prompt information for playing the second video associated with the first video to the terminal device comprises at least one of:

in a case where the terminal device pauses the video content of the first video, sending the prompt information for playing the second video associated with the first video to the terminal device;

in a case where the terminal device plays advertisements, sending the prompt information for playing the second video associated with the first video to the terminal device; or in a case of a preset time remaining until an end of playing the video content of the first video, sending the prompt information for playing the second video associated with the first video to the terminal device.

20. A terminal device, comprising:

one or more processors; and a memory, which is configured to store one or more programs;

wherein when executed by the one or more processors, the one or more programs causes the one or more processors to implement the video playing processing method, wherein the method comprises:

receiving prompt information for playing a second video associated with a first video sent by an application server, wherein the first video is a video being currently played, and the first video and the second video comprise a same video content segment, and at least one of the first video or the second video contain a video segment different from the same video content segment; and showing the prompt information for playing the second video associated with the first video; and playing video content of the second video;

wherein playing the video content of the second video comprises:

playing video content of the second video that matches a playing progress of the first video based on the playing progress of the first video and positioning information of the same video content segment in the first video and positioning information of the same video content segment in the second video, wherein the positioning information is used to represent start time or a position of the same video content segment in the first video and the second video.

* * * * *